United States Patent [19]

Reeber

[11] 3,745,356

[45] July 10, 1973

[54] ELECTRO-OPTICAL APPARATUS FOR SIMULTANEOUSLY SCANNING A SET OF TRANSPARENCIES

[75] Inventor: Nicholas J. Reeber, Hauppauge, N.Y.

[73] Assignee: Hazeltine Corporation, Greenlawn, N.Y.

[22] Filed: Dec. 23, 1971

[21] Appl. No.: 211,797

Related U.S. Application Data

[62] Division of Ser. No. 874,550, Nov. 6, 1969, abandoned.

[52] U.S. Cl. .......... 250/220 R, 250/226, 250/219 Q

[51] Int. Cl. .......... H01j 39/12

[58] Field of Search .......... 250/219 DA, 220, 250/220 SP, 226, 237, 216, 217 CR, 219 Q; 178/5.2, 5.2 A, 6.7 A

[56] References Cited

UNITED STATES PATENTS

| | | | |
|---|---|---|---|
| 3,621,126 | 11/1971 | Taudt | 250/220 R |
| 3,123,666 | 3/1964 | Bailey | 178/5.2 A |
| 3,131,252 | 4/1964 | Farber et al. | 178/5.2 A |
| 2,984,750 | 5/1961 | Herridt | 250/217 CR X |
| 2,894,058 | 7/1959 | Shapiro | 250/217 CR X |

*Primary Examiner*—Walter Stolwein
*Attorney*—Kenneth P. Robinson

[57] ABSTRACT

Disclosed is novel electro-optical apparatus useful for scanning simultaneously, in parallel, the four photographic transparencies of a four-color separation set. The electro-optical apparatus utilizes a bank of four lenses to simultaneously image the raster of a scanning light source onto each of four corresponding color separation transparencies which are positioned in a rectangular array in a common plane. The scanning light transmitted by each transparency is independently collected and detected to generate a set of output signals, each of which is representative of the transmissivity of successively scanned elemental areas of a corresponding one of the separation transparencies. The relative positions of the scanning light source, the bank of lenses and the set of color separations are readily adjustable, thereby permitting the apparatus to scan color separation transparency sets of different dimensions.

9 Claims, 3 Drawing Figures

Patented July 10, 1973 3,745,356

2 Sheets-Sheet 1

ELECTRO-OPTICAL APPARATUS FOR SIMULTANEOUSLY SCANNING A SET OF TRANSPARENCIES

This is a division of applicant's copending application, Ser. No. 874,550, filed Nov. 6, 1969 entitled "Graphic Arts Process Simulation System," now abandoned.

INTRODUCTION

The present invention relates to electro-optical apparatus which is useful in conjunction with the graphic arts process simulation system described in the aforementioned copending application for simultaneously scanning a set of color separation transparencies in a manner which is particularly simple compared with the prior art and which permits different size separations to be readily scanned.

It is an object of the present invention to provide new and improved electro-optical apparatus useful in such color proofing systems for scanning a set of color separation transparencies in a particularly simple manner that permits different size transparency sets to be scanned by means of readily made adjustments in the electro-optical apparatus.

In accordance with the present invention electrooptical apparatus for simultaneously scanning a set of transparencies with light for developing a corresponding set of image signals, each representing the amount of scanning light transmitted through successively scanned elemental areas of a corresponding one of the transparencies, comprises scanning light source means for repetitively scanning a predetermined raster with a spot of light and means for accepting and positioning the transparencies of the set in a nonoverlapping orientation in a common plane. The apparatus further includes a set of lenses, located in a plane between the scanning light source means and the set of positioned transparencies, each lens for imaging the raster onto a corresponding one of the transparencies, thereby simultaneously scanning the transparencies with light from the source, and each lens having an optical axis which intersects a boundary point on the raster and a corresponding boundary point on the transparency associated with that lens. The apparatus finally includes a set of light collection and detection means, each for collecting and detecting the scanning light transmitted by a corresponding one of the positioned transparencies for developing a set of image signals, each representative of the amount of scanning light transmitted through successively scanned elemental areas of a corresponding one of the transparencies.

For a better understanding of the present invention, together with other and further objects thereof, reference is had to the following description taken in connection with the accompanying drawings and its scope will be pointed out in the appended claims.

DESCRIPTION

Figure 1:
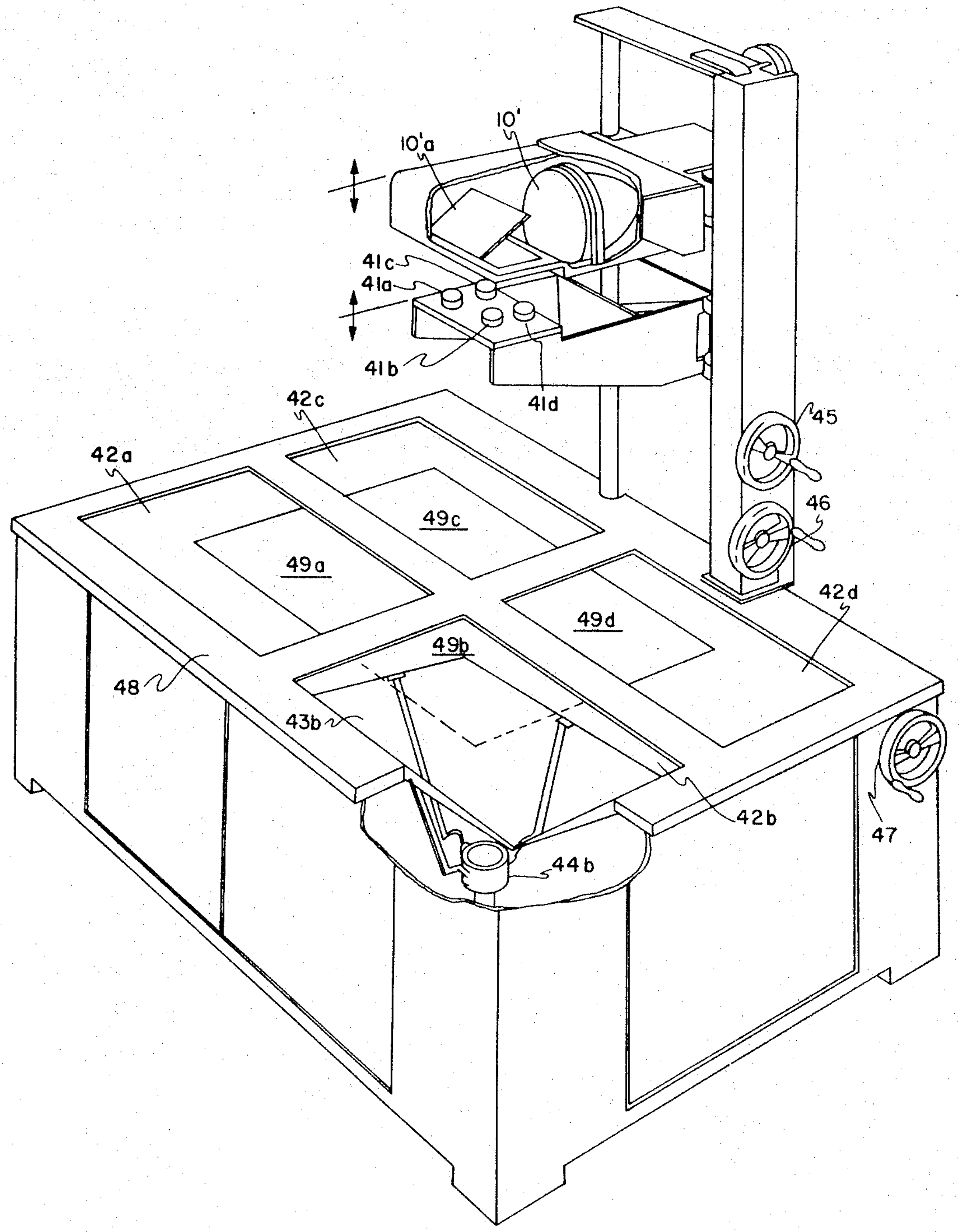
FIG. 1 is a perspective view of actual equipment embodying the present invention.
Figure 2:
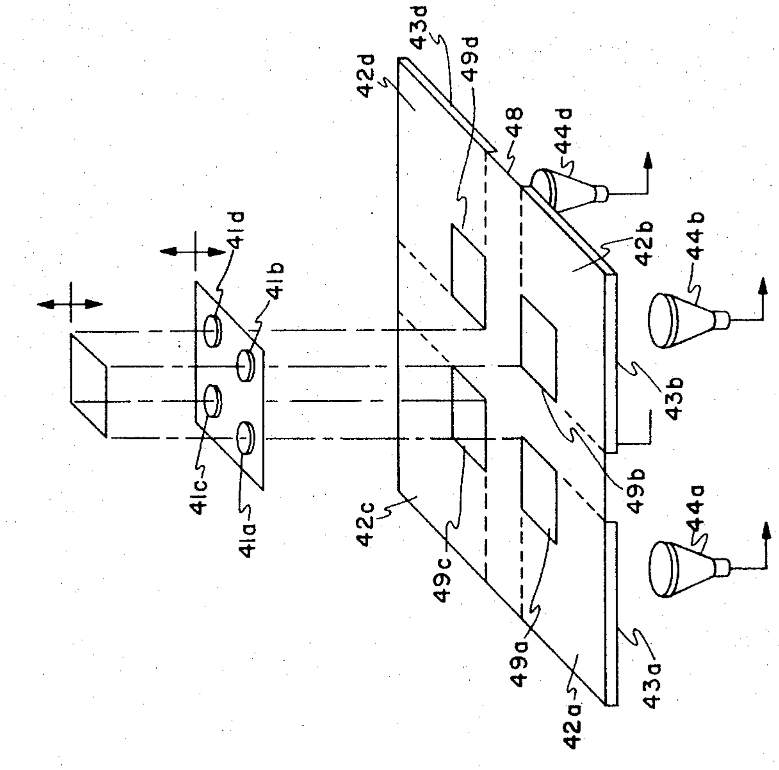
FIG. 2 is a perspective view of an electro-optical system constructed in accordance with one embodiment of the present invention.

Shown in FIGS. 1 and 2 of the drawings is electro-optical apparatus useful in connection with the graphic arts process simulation system disclosed and claimed in the above-mentioned copending application.

In a system constructed in accordance with the present invention a set of color separation transparencies is scanned by means of electro-optical apparatus to develop a set of image signals, each of which is representative of the transmissivity of successively scanned elemental areas of a corresponding one of the transparencies. Such electro-optical apparatus is capable of accepting color separation sets consisting of four transparencies, and sets which may be of different size.

The electro-optical apparatus shown in perspective view in FIGS. 1 and 2 includes the combination of a flying spot scanner 10' and an associated mirror **10'*a* which comprises scanning light source means for repetitively scanning a predetermined raster with a spot of light. The flying spot scanner may be of conventional design, having a short persistence phosphor which, when activated by a beam of electrons, creates a small spot of light (typically four mils in diameter) on the face of the scanner. Associated conventional deflection circuitry, which is not shown, scans the spot to create a predetermined rectangular TV type raster consisting of parallel lines. Mirror 10'*a*** is provided merely to permit the scanner to be mounted in a horizontal position instead of vertically. Additional circuitry may be included to provide dynamic focusing of the electron beam of the flying spot scanner in order to improve the uniformity of the light generation characteristic of the flying spot scanner over the entire raster area. Also, circuitry which responds to the light output of the flying spot scanner and which includes a feedback loop for modulating the intensity of the scanner's electron beam can also be included to further improve light uniformity over the entire raster area.

Also included in the electro-optical apparatus of FIGS. 1 and 2 is means for accepting and positioning a set of four separation transparencies in a nonoverlapping orientation and substantially in a common plane. In the apparatus of FIGS. 1 and 2 this means comprises the surface of table 48 having four identical apertures arranged in a rectangular array. Each aperture contains a transparent glass plate large enough to accommodate the largest size set of separation transparencies that it is desired to proof. Each of the transparencies **49*a*, 49*b*, 49*c*, 49*d* of the set to be scanned is placed on a corresponding one of the glass plates 42*a*, 42*b*, 42*c* and 42*d* in such a manner that a corner of each transparency occupies the central corner of its associated aperture as shown in FIGS. 1 and 2. This orientation of the transparency set can be maintained by any suitable mechanical indexing scheme, such as a set of small index pins in the top of table 48 and a corresponding set of index holes in the edges of the color separation transparencies. As will be explained in detail hereinafter, this orientation of the transparency set enables the apparatus to conveniently accommodate transparency sets of different size. Thus, the apparatus is capable of scanning transparency sets which are 5, 10, or 20 inches long for example with equal ease, so long as the transparencies of each set are oriented such that one corner of each transparency occupies the central corner of its corresponding glass plate in an aperture of the table 43, as shown in FIGS. 1 and 2**.

Electro-optical apparatus constructed in accordance with the present invention also includes a set of lenses 41*a*, 41*b*, 41*c* and 41*d* shown in FIGS. 1 and 2, located in a plane between the scanning light source means and the set of positioned transparencies and parallel to the plane of the latter. Each lens images the raster scanned by the flying spot scanner 10' onto a corresponding one of the positioned transparencies, thereby simultaneously scanning all of the transparencies. In accordance with one aspect of the invention, each of the lenses has an optical axis which intersects a given boundary of the raster scanned by the flying spot scanner 10' and a corresponding boundary of the transparency associated with that lens. More particularly, as shown in FIG 2, the optical axis of each lens intersects a corner of the raster and the central corner of its associated transparency on table 48. Since the central corners of the apertures in table 48 are utilized as the referenced points for orienting each of the color separation transparencies of a set within the apertures, each of the four optical axes will always intersect the central corner of a corresponding one of a set of four separation transparencies when the set is properly oriented within the apertures of the table 48. This unique relationship between the corners of the raster scanned by the flying spot scanner, the optical axes of the lens set 41*a* – 41*d* and the central corners of the transparency set placed within the apertures of the table top 48, permits the apparatus of FIGS. 1 and 2 to accommodate transparency sets of different size, since the location of these central corners is the same for every set of transparencies regardless of their size. As different size transparency sets are utilized, they merely occupy a greater or lesser area within the aperture in a radial direction from the central corners which are used as reference orientation points.

For clarity in explaining the above relationship between the raster scanned by flying spot scanner 10', the axes of lenses 41*a* – 41*d* and the set of transparencies 49*a* – 49*d*, it was assumed that the axes of lenses 41*a* – 41*d* intersected the actual corners of the raster and the actual corners of the transparencies. In practice, however, the raster is generated slightly oversize so that the axes of lenses 41*a* – 41*d* intersect the four corners of an effective raster area which lies within the oversize raster. Also, in practice each of the transparencies 49*a* – 49*d* will normally contain an opaque border surrounding the actual image area. Therefore it is the central corner of each image area of a transparency that is intersected by one of the axes of the lenses 41*a* – 41*d*.

The electro-optical apparatus of FIGS. 1 and 2 finally includes a set of light collection and detection means, each for collecting and detecting the scanning light transmitted by a corresponding one of the positioned transparencies for developing a set of image signals, $T_c$, $T_m$, $T_y$, $T_k$, each image signal being representative of the amount of scanning light transmitted through successively scanned elemental areas of a corresponding one of the transparencies. In the embodiment of FIGS. 1 and 2, each of the light collection and detection means consists of a large Fresnel lens and an associated photomultiplier. For example, in FIG. 1 the Fresnel lens 43*b* and its associated photomultiplier 44*b* are shown through the outout section of the equipment. These components are also shown in greater detail in FIG. 3.

Figure 3:
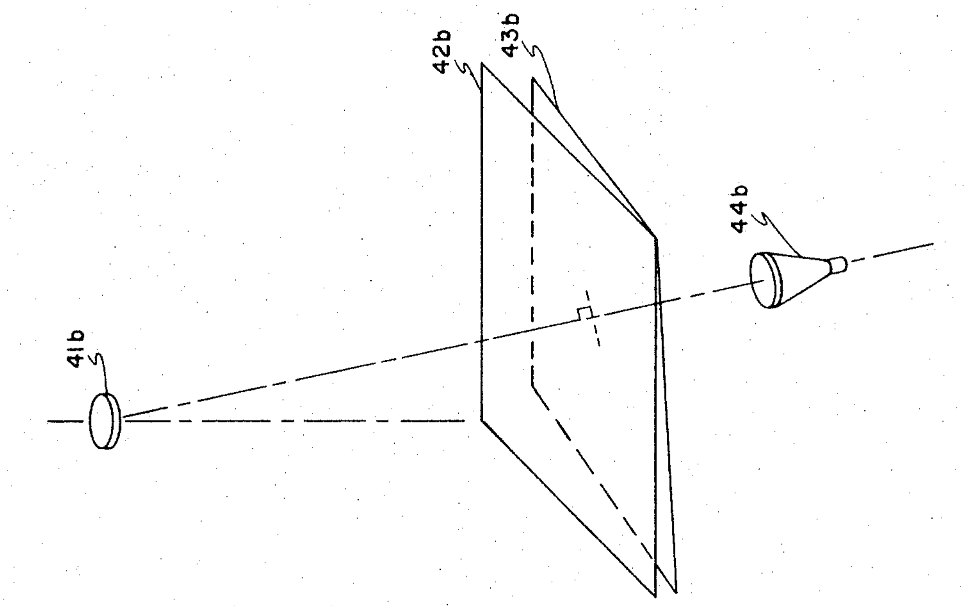
FIG. 3 illustrates in further detail one feature of the electro-optical system of FIG. 2.

The location of the flying spot scanner assembly and that of the set of lenses 41*a* – 41*d* are independently adjustable in a vertical direction along a common axis which passes through the center of the raster and the center of the bank of lenses 41*a* – 41*d*, via the control handles 45 and 46, respectively, of FIG. 1, in order to accommodate separation transparency sets of different size. It is therefore desirable to provide a corresponding change in the orientation of the Fresnel lens and photomultiplier for each channel, so that the plane of each Fresnel lens remains orthogonal to an imaginary line drawn through the center of its corresponding imaging lens and the center of the Fresnel lens. This imaginary line should also pass through the center of the associated photomultiplier as shown in FIG. 3. As can be seen in the diagram of FIG. 3, which illustrates this feature, as the imaging lens 41*b* moves in a vertical direction along its axis, the Fresnel lens 43*b* is rotated about its outside corner (diagonally oppposite its central corner) in order to maintain orthogonality between the imaginary line which passes through the center of the lens 41*b* and the plane of lens 43*b*. Movement of the Fresnel lens may be accomplished by any suitable mechanical arrangement controlled preferably from outside the apparatus of FIG. 1 by control handle 47, for example. Since movement of the Fresnel lenses should be coordinated with vertical movement of the imaging lenses 41*a* – 41*d*, appropriate index marks can be provided on the control wheels 46 and 47 so that movement of the Fresnel lenses can be matched to movement of the imaging lenses. Alternatively, the control wheels can be mechanically synchronized.

A simpler light collection and detection scheme, which can be used in place of the Fresnel lens-single photomultiplier combination shown in FIGS. 1 and 2, is disclosed U.S. Pat. No. 3,617,752 issued Nov. 2, 1971 and assigned to the same assignee as is the present case. Furthermore, if it is desired to reduce the effects of nonuniformities in the electro-optics of each channel to a minimum, the compensation apparatus disclosed in copending application Ser. No. 874,547, filed Nov. 6, 1969 now abandoned and assigned to the same assignee as is the present case, can be used in conjunction with either light collection and detection arrangement.

While there has been described what is at present considered to be the preferred embodiment of this invention, it will be ovious to those skilled in the art that various changes and modifications may be made therein without departing from the invention.

What is claimed is:

1. Electro-optical apparatus capable of simultaneously scanning a set of four transparencies, each containing a rectangular image, with light for developing a corresponding set of image signals, each representing the amount of scanning light transmitted through successively scanned elemental areas of a corresponding one of said transparencies, comprising:

scanning light source means for repetitively scanning a predetermined rectangular raster with a spot of light;

means for accepting and positioning the transparencies of said set in a nonoverlapping orientation in a common plane;

a set of lenses, located in a plane between said scanning light source means and said set of positioned transparencies, each lens for imaging said raster onto a corresponding one of said transparencies, thereby simultaneously scanning said transparencies with light from said source, and each lens having an optical axis which intersects a corner of said raster and a corresponding corner of the image contained in the transparency associated with that lens;

and a set of light collection and detection means, each for collecting and detecting the scanning light transmitted by a corresponding one of said positioned transparencies for developing a set of image signals, each representative of the amount of scanning light transmitted through successively scanned elemental areas of a corresponding one of said transparencies.

2. Apparatus constructed in accordance with claim 1 wherein the optical axes of the lenses in said set are parallel to each other and wherein the plane in which said lenses are located is parallel to the plane in which said transparencies are positioned.

3. Apparatus constructed in accordance with claim 2 wherein the relative positions of said light source means, said set of lenses and said means for accepting and positioning transparencies are adjustable along common axis which passes through the center of said raster, the center of said lens set and the center of said means for accepting and positioning transparencies, thereby permitting said apparatus to scan transparency sets having different image dimensions.

4. Apparatus constructed in accordance with claim 1, wherein said means for accepting and positioning a set of transparencies comprises a planar surface having four rectangular transparency accepting apertures therein, arranged in a rectangular array, said apertures each having a central corner with said four central corners defining a rectangle whose dimensions are less than the corresponding dimensions of the rectangular raster scanned by said light source, and wherein each of said apertures accepts and positions a corresponding one of said transparencies in such a manner that a corner of the rectangular image contained in the transparency intersects the optical axis of the lens associated with that transparency.

5. Apparatus constructed in accordance with claim 1 wherein each of said means for collecting and detecting light consists of the combination of a lens and a photomultiplier, with said lens focusing the scanning light transmitted by a corresponding one of said transparencies onto said photomultiplier.

6. Electro-optical apparatus for simultaneously scanning a set of four rectangular image bearing transparencies with light, for developing a corresponding set of image signals, each representing the amount of scanning light transmitted through successively scanned elemental areas of a corresponding one of said transparencies, comprising:

scanning light source means for repetitively scanning a predetermined rectangular raster with a spot of light;

means, including a planar surface having four rectangular tarnsparency accepting apertures therein arranged in a rectangular array, said apertures each having a central corner with said four central corners defining a rectangle whose dimensions are less than the corresponding dimensions of the rectangular raster scanned by said light source means, for accepting and positioning in each of said apertures a corresponding one of the four transparencies of said set such that a corner of each transparency occupies the central corner of its associated aperture;

a set of four lenses, located in a plane which lies between said scanning light source means and said set of positioned transparencies and which is parallel to the plane of said transparencies, each lens for imaging said raster onto a corresponding one of said four transparencies, thereby simultaneously scanning said transparencies, and each lens having an optical axis which intersects a corner of said raster and a corresponding central corner of the image contained in the transparency associated with that lens;

and a set of light collection and detection means, each for collecting and detecting the scanning light transmitted by a corresponding one of said four transparencies, for developing a set of four image signals, each representative of the amount of scanning light transmitted through successively scanned elemental areas of a correpsonding one of said four positioned transparencies.

7. Apparatus constructed in accordance with claim 6 wherein the optical axes of the lenses in said set are parallel to each other and wherein the plane in which said lenses are located is parallel to the plane in which said transparencies are positioned.

8. Apparatus constructed in accordance with claim 7 wherein the relative positions of said light source means, said set of lenses and said means for accepting and positioning transparencies are adjustable along a common axis which passes through the center of said raster, the center of said lens set and the center of the rectangle formed by the central corners of said four apertures, thereby permitting said apparatus to scan transparency sets having different image dimensions.

9. Apparatus constructed in accordance with claim 6 wherein each of said means for collecting and detecting light consists of the combination of a lens and a photomultiplier, with said lens focusing the scanning light transmitted by a corresponding one of said transparencies onto said photomultiplier.

* * * * *